US012638036B2

(12) United States Patent
Nijdam et al.

(10) Patent No.: US 12,638,036 B2
(45) Date of Patent: May 26, 2026

(54) FASTENING ASSEMBLY

(71) Applicant: J. VAN WALRAVEN HOLDING B.V.,
Mijdrecht (NL)

(72) Inventors: Frank Nijdam, Harderwijk (NL);
Marek Juzak, Mijdrecht (NL)

(73) Assignee: J. VAN WALRAVEN HOLDING B.V.,
Mijdrecht (NL)

( * ) Notice: Subject to any disclaimer, the term of this
patent is extended or adjusted under 35
U.S.C. 154(b) by 138 days.

(21) Appl. No.: 18/263,073

(22) PCT Filed: Jan. 27, 2022

(86) PCT No.: PCT/EP2022/051853
§ 371 (c)(1),
(2) Date: Jul. 26, 2023

(87) PCT Pub. No.: WO2022/162047
PCT Pub. Date: Aug. 4, 2022

(65) Prior Publication Data
US 2024/0110587 A1      Apr. 4, 2024

(30) Foreign Application Priority Data
Jan. 27, 2021    (NL) ...................................... 2027443

(51) Int. Cl.
*F16B 13/04*          (2006.01)
*F16B 13/06*          (2006.01)
(Continued)

(52) U.S. Cl.
CPC ........ *F16B 13/0833* (2013.01); *F16B 13/045*
(2013.01); *F16B 13/068* (2013.01); *F16B
13/0858* (2013.01); *F16B 13/001* (2013.01)

(58) Field of Classification Search
CPC .. F16B 13/001; F16B 13/0858; F16B 13/045;
F16B 13/066; F16B 13/068; F16B
13/0825
(Continued)

(56) References Cited

U.S. PATENT DOCUMENTS 2,392,491 A * 1/1946 Moran ................ F16B 19/1063
411/54
3,919,917 A * 11/1975 Thorsman ............. F16B 13/045
411/54
(Continued)

FOREIGN PATENT DOCUMENTS

CN         203614539 U      5/2014
DE            2442759 A1    3/1976
(Continued)

OTHER PUBLICATIONS

International Search Report for PCT/EP2022/051853 dated Jan. 27,
2022 (3 pages).
(Continued)

*Primary Examiner* — Flemming Saether
(74) *Attorney, Agent, or Firm* — Tutunjian & Bitetto, P.C.

(57) ABSTRACT
A blind fastening assembly includes a bolt having a bolt
shank and a bolt head, a metal expansion sleeve fitted in use
over at least a part of the bolt shank and having deformable
wall segments, a washer arranged over the bolt shank, a
wedge member arranged between the washer and the expan-
sion sleeve and having a wedge portion adapted to be
inserted in one end of the expansion sleeve, and a nut
arranged on the shank. The nut is adapted to tighten the
washer and the expansion sleeve towards each other so as to
pull the wedge portion of the wedge member into the
expansion sleeve resulting in the wall segments being
pushed outwardly. The wall segments have an inner side
with an inner side surface adapted and arranged to engage a
(Continued)

wall surface surrounding the opening in the wall of the constructional member opposite the washer.

20 Claims, 4 Drawing Sheets

(51) Int. Cl.
  *F16B 13/08*        (2006.01)
  *F16B 13/00*        (2006.01)
(58) Field of Classification Search
  USPC ...................................... 411/32, 38, 57.1, 52
  See application file for complete search history.

(56)                References Cited

U.S. PATENT DOCUMENTS

| | | | | |
|---|---|---|---|---|
| 4,033,222 | A | | 7/1977 | Wilson |
| 4,293,259 | A | * | 10/1981 | Liebig ................. F16B 13/0833 |
| | | | | 411/65 |
| 4,690,597 | A | * | 9/1987 | Liebig ..................... B25B 31/00 |
| | | | | 411/57.1 |
| 5,178,502 | A | | 1/1993 | Sadri |
| 7,014,405 | B2 | * | 3/2006 | Behle ................... F16B 13/124 |
| | | | | 411/21 |

| | | | | |
|---|---|---|---|---|
| 10,190,613 | B2 | * | 1/2019 | Niklewicz ........... F16B 13/0825 |
| 2004/0208722 | A1 | * | 10/2004 | Kuenzel .............. F16B 13/0833 |
| | | | | 411/340 |
| 2006/0182492 | A1 | * | 8/2006 | Keller ................. F16B 13/0858 |
| | | | | 411/389 |
| 2009/0022564 | A1 | * | 1/2009 | Summerfield ...... F16B 13/0858 |
| | | | | 411/45 |
| 2010/0172713 | A1 | * | 7/2010 | Benson ................. F16B 13/066 |
| | | | | 411/35 |
| 2013/0185920 | A1 | * | 7/2013 | Peled ..................... F16B 39/22 |
| | | | | 411/57.1 |

FOREIGN PATENT DOCUMENTS

| | | | |
|---|---|---|---|
| DE | 2754910 | A1 | 6/1979 |
| FR | 1266450 | A | 7/1961 |
| GB | 1270522 | A | 4/1972 |
| JP | 2004347037 | A | 12/2004 |

OTHER PUBLICATIONS

Chinese Office Action issued in corresponding Application No. CN202280011787.4 dated Feb. 12, 2026, pp. 1-8.

* cited by examiner

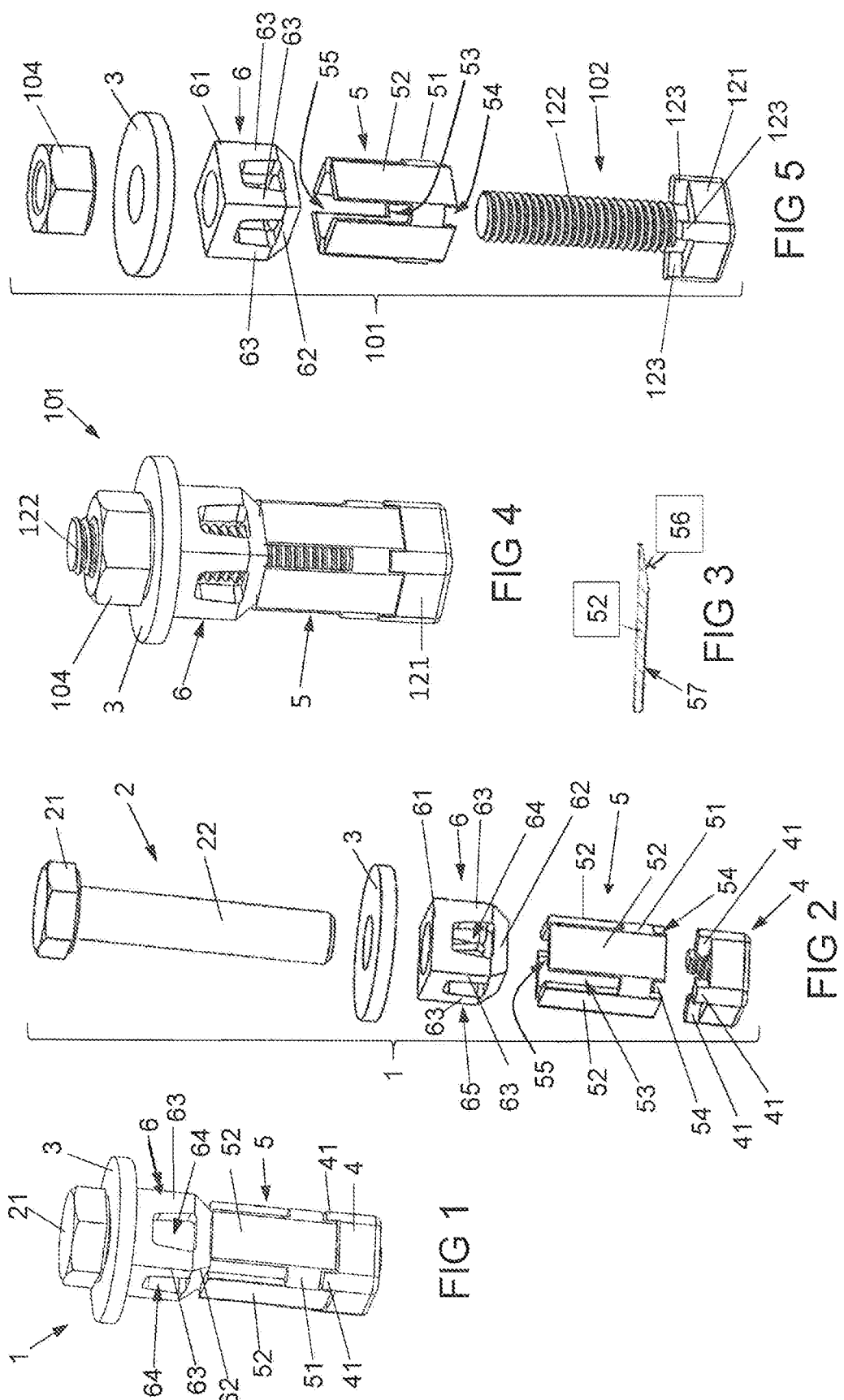

FASTENING ASSEMBLY

FIELD OF THE INVENTION

The present invention relates to a fastening assembly adapted to be inserted through a mounting opening in a wall of a constructional member, the fastening assembly comprising:
- a bolt having an at least partially threaded bolt shank and a bolt head,
- an expansion sleeve fitted in use over at least a part of the bolt shank and having deformable wall segments;
- a washer arranged over the bolt shank and adapted to engage a wall surface of the constructional member or another component to be attached to the constructional member;
- a wedge member arranged between the washer and the expansion sleeve and having a wedge portion adapted to be inserted in one end of the expansion sleeve;
- a threaded nut arranged on the threaded portion of the shank and adapted to cooperate with the bolt to tighten the washer and the expansion sleeve towards each other so as to pull the wedge portion of the wedge member into the expansion sleeve resulting in the wall segments being pushed outwardly.

DESCRIPTION OF RELATED ART

A fastening assembly of this type is for example shown in FIG. 2 of U.S. Pat. No. 5,178,502. In this known fastening assembly the expansion sleeve is tightened over a wedge member whereby the head surface of the expansion sleeve expands to a larger diameter. In the fully tightened state this head surface of the expansion sleeve abuts the wall surrounding the opening through which the fastening assembly passes. DE 2754910 A1 shows in FIGS. 4 and 5 a similar fastening assembly, in which the expansion sleeve and the nut are integrated into one piece.

An object of the invention is to provide an alternative fastening assembly of the above-mentioned type.

SUMMARY OF THE INVENTION

This object is achieved by a fastening assembly adapted to be inserted through a mounting opening in a wall of a constructional member, the fastening assembly comprising:
- a bolt having an at least partially threaded bolt shank and a bolt head,
- an expansion sleeve fitted in use over at least a part of the bolt shank and having deformable wall segments;
- a washer arranged over the bolt shank and adapted to engage a wall surface of the constructional member or another component to be attached to the constructional member;
- a wedge member arranged between the washer and the expansion sleeve and having a wedge portion adapted to be inserted in one end of the expansion sleeve;
- a threaded nut arranged on the threaded portion of the shank and adapted to cooperate with the bolt to tighten the washer and the expansion sleeve towards each other so as to pull the wedge portion of the wedge member into the expansion sleeve resulting in the wall segments being pushed outwardly,
- wherein the expansion sleeve is a metal part, wherein the wall segments of the expansion sleeve have an inner side with an inner side surface adapted and arranged to engage a wall surface surrounding the opening in the wall of the constructional member opposite the washer when tightening the fastening assembly to a tightened state.

In the fastening assembly according to the invention, the expansion sleeve is adapted to bend its segments to such a degree that the end of the expansion sleeve that has advanced towards the wall, engages with its inner surface the surface of the wall surrounding the opening. By further tightening the fastening assembly, the sleeve segments will bend further and a larger contact surface will be created between the inner surface of sleeve segments and the surface portion of the wall surrounding the opening. This increased contact surface prevents high local forces on the wall surface portion surrounding the opening, contrary to the fastening assemblies of U.S. Pat. No. 5,178,502 and DE 2754910 A1, which would incur high local stresses in the material of the wall surrounding the opening. The lower forces on the wall surface surrounding the opening prevents that the opening can deform which may allow inadvertent loosening of the fastening assembly from the constructional member.

In an embodiment of the fastening assembly the inner side of the wall segments of the expansion sleeve have a slanting inner surface portion towards the edge, which slanting inner surface portion is adapted and arranged to at least initially engage a wall surface surrounding the opening in the wall when tightening the fastening assembly. The slanting inner surface portion facilitates the initial sliding over the wedge portion and it facilitates to bring the inner side of the wall segments of the expansion sleeve in initial contact with the wall of the constructional member. Furthermore, the slanting surface portion guides the wall segments along the wall surface of the constructional member upon further tightening of the assembly. It is envisaged that the fastening assembly may in use be tightened so far that the initial contact between the slanting surface portions and the wall of the wall surface of the constructional member may be lost again at some point, and the wall segments of the expansion sleeve are bent to such a degree that a non-slanting inner surface portion of the segments engages the wall of the constructional member.

In an embodiment of the fastening assembly, the wedge member is a collapsible part, which is adapted to collapse when the wall segments of the expansion sleeve are tightened towards the wall of the constructional member. The collapsibility of the wedge member allows that the expansion sleeve can be drawn closer to the wall of the constructional part. Thereby the contact surface between the inner side of the segments of the expansion sleeve and the wall surface surrounding the opening can be increased. The results in a better force distribution.

In a possible embodiment of the fastening assembly, the wedge member comprises a crumple zone extending from the wedge portion towards the washer.

Preferably the crumple zone includes collapsible spacers, e.g. limbs or walls connected to the wedge portion. These collapsible spacers may be circumferentially separated by intermediate spaces or by intermediate wall portions weaker than the collapsible spacers, or a combination of intermediate spaces and relatively weak intermediate wall portions.

In a further embodiment, the collapsible spacers are interconnected at an end facing away from the wedge portion by an annular end portion, the annular end portion having an engagement surface engaging the washer.

In a possible embodiment, the wedge member is a plastic part.

Preferably, the wedge member is made in one piece. If made from plastic, it may conveniently be made by an injection moulding process.

In a possible embodiment, the wedge member is adapted to block rotation of the wedge member in the mounting opening in the wall of the constructional member.

In a possible embodiment, the wedge member and the expansion sleeve are adapted to block mutual rotation around a central axis of the fastening assembly. In a possible embodiment, the expansion sleeve may have a substantially square cross section and the wedge member may have a substantially square cross section. The complementary square cross sectional shapes of the expansion sleeve and the wedge member result in blocking mutual rotation of the expansion sleeve and the wedge member. However, also other shapes and means that provide an interlocking in rotational direction around a central axis of the fastening assembly are conceivable.

In a possible embodiment the bolt head is located on the washer sided end and the nut is arranged on the sleeve sided end. In this embodiment, the nut and the expansion sleeve may be adapted to block mutual rotation between the nut and expansion sleeve. In one particular embodiment that is foreseen, the expansion sleeve may be provided with notches and the nut may be provided with lugs, which are received in the notches so as to block mutual rotation between nut and expansion sleeve. However, it must be noted that also other means, which provide an interlocking or fixation in rotational direction around a central axis of the fastening assembly, are conceivable. It is for example also possible to fixedly connect the nut and the expansion sleeve, e.g. by welding. Another option may be to form the nut and expansion sleeve in one piece.

In another possible embodiment the bolt head is located on the sleeve sided end and the nut is located on the washer sided end. In this embodiment, the bolt head and the expansion sleeve may be adapted to block mutual rotation between the bolt and expansion sleeve. In one particular embodiment that is foreseen, the expansion sleeve may be provided with notches and the bolt head may be provided with lugs, which are received in the notches so as to block mutual rotation between bolt head and expansion sleeve. However, also here it must be noted that also other means, which provide an interlocking or fixation in rotational direction around a central axis of the fastening assembly, are conceivable. It is for example also possible to fixedly connect the bolt head and the expansion sleeve, e.g. by welding.

In a possible embodiment, the expansion sleeve is formed as a metal base strip and at least two straight lips connected to and extending from the base strip, said lips being separated by a longitudinal gap, wherein the base strip is formed into an annular shape. Preferably, the expansion sleeve has four adjacent straight lips connected to and extending from the base strip.

The base strip may be folded into a rectangular shape, in which the corners are located at the level of the gaps. Alternatively, the base strip may be folded into a circular shape or another suitable annular shape.

In a possible embodiment, the insert end of the expansion sleeve is remote from the base strip, wherein at least a part of the lips has a thickness taper towards the end, said thickness taper forming the slanting inner surface portion of the expansion sleeve for cooperation with the wedge member. The slanting inner surface portion can also cooperate with the wall of the constructional member, when the expansion sleeve is further advanced to towards the wall by tightening the bolt/nut combination of the fastening assembly.

The invention will be further elucidated with reference to the drawings.

BRIEF DESCRIPTION OF THE DRAWINGS

FIG. 1 shows a view in perspective of a first embodiment of a fastening assembly according to the invention;

FIG. 2 shows an exploded view of the fastening assembly of FIG. 1;

FIG. 3 shows a cross section through a lip of an expansion sleeve of a fastening assembly of FIG. 1;

FIG. 4 shows a view in perspective of a second embodiment of a fastening assembly according to the invention;

FIG. 5 shows an exploded view of the fastening assembly of FIG. 4;

DETAILED DESCRIPTION

Figure 7:
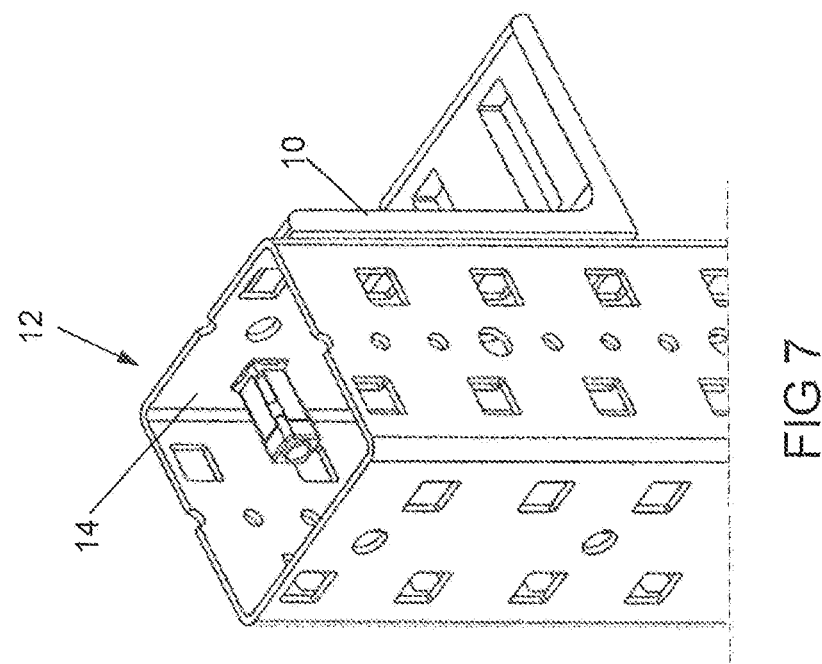
FIGS. 6-7 and FIGS. 8A-8E illustrate the mounting of a component to a channel profile element by means of a fastening assembly of FIG. 1.
Figure 6:
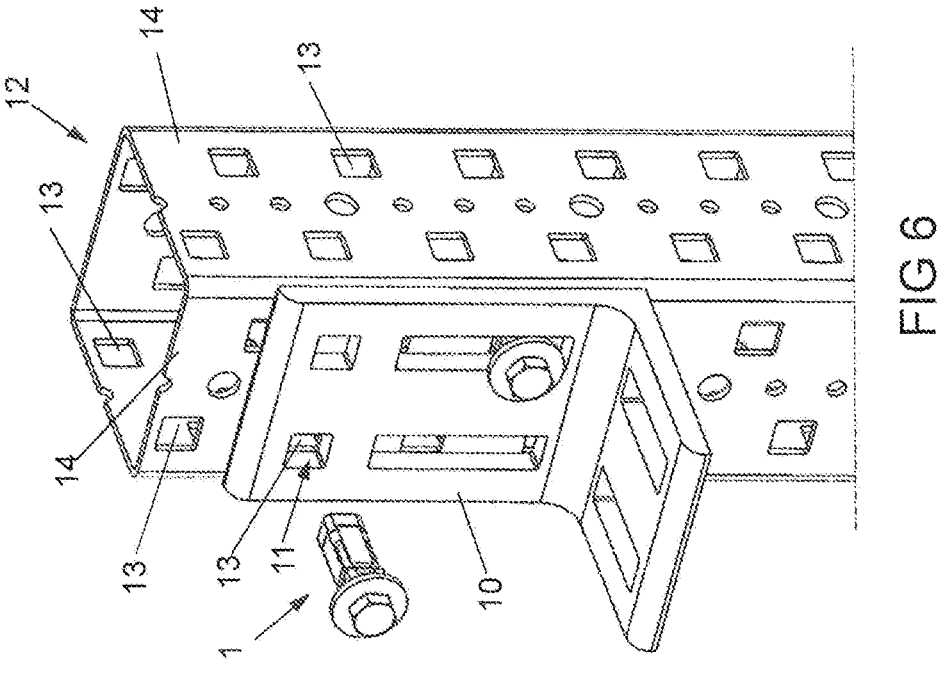

FIGS. 1 and 2 illustrate an embodiment of a fastening assembly 1 according to the invention. The fastening assembly 1 includes a bolt 2 having a bolt head 21 and a bolt shank 22. The bolt shank 22 is provided with a male screw thread. The bolt 2 may be characterised as a conventional screw bolt. The fastening assembly 1 furthermore includes a washer 3, preferably a metal washer. Furthermore, the assembly comprises a nut 4. The nut 4 has a female screw thread, which can cooperate with the male thread of the bolt shank 22.

The fastening assembly 1 also comprises an expansion sleeve 5 and a wedge member 6. In the assembled state, the central axis of the bolt 2 defines the central axis of the fastening assembly 1.

As can be seen, the nut 4 has a substantially square shape, which is adapted to the shape of the expansion sleeve 5. The expansion sleeve 5 is formed as a metal base strip 51 and in this case four adjacent straight lips 52 connected to and extending from the base strip 51. The lips 52 are separated by a longitudinal gap 53. The base strip 51 is formed into a square annular shape whereby the expansion sleeve 5 becomes a generally square cross section. At the edge of the base strip 51 facing away from the lips 52 four notches 54 are provided in the strip 51, which are aligned with the longitudinal gaps 53. The square nut 4 has four lugs 41 at the corners, which are received in the notches 54 of the expansion sleeve 5 as is visible in FIG. 1.

The wedge member 6 is made of a plastic material. The wedge member 6 has a base ring 61, a wedge portion 62 and collapsible spacers 63 extending between the wedge portion 62 and the base ring 61. The wedge member 6 has a substantially square cross section. The collapsible spacers 63 are in this embodiment formed as four columns at the corners of the square shape. The collapsible spacers 63 are circumferentially separated by intermediate spaces 64. The wedge portion 62 has a tapering shape from the front towards the collapsible spacers 63. In another possible embodiment the intermediate spaces 64 could also be replaced by thin wall portions, which are weaker than the spacers 63.

In the assembled state, the wedge portion 62 is positioned against an entry end 55 of the expansion sleeve 5 as is shown in FIG. 1. The washer 3 is positioned against the base ring 61 of the wedge member 6. The nut 4 is positioned against the end of the expansion sleeve 5 that is remote from the wedge member 6. The lugs 41 are received in the notches 54.

In the assembled state, the bolt shank 22 extends through the washer 3, the wedge member 6, the expansion sleeve 5 and the nut 4. The bolt head 21 engages the washer 3.

In use, the fastening assembly 1 is for example used to mount a part such as a bracket 10 shown in FIGS. 6-7 and FIGS. 8A-8E to a channel profile 12, which may for example be used as an upright. The fastening assembly 1 is inserted as a blind fastener through a mounting opening 11 in the bracket 10 and an aligned mounting opening 13 in the profile 12. When the fastening assembly 1 is fully inserted and the washer engages the bracket 10 surrounding the opening 11, the user can rotate the bolt by means of a tool, e.g. a spanner, engaging the bolt head 21. By rotating the bolt 2 the shank 22 is screwed in the nut 4 and the combination is tightened. The nut 4 is prevented from rotating with the bolt 2 by the lugs 41, which are received in the notches 54 of the expansion sleeve 5. The expansion sleeve 5 is prevented from rotating because its rotation is blocked by the wedge member 6 inserted in the insert end 55 of the expansion sleeve 5. The wedge member 6 in turn is blocked because it has a square outer contour corresponding to the shape of the opening 13 in the wall 14 of the profile 12 and/or the opening 11 of the bracket 10.

By tightening of the bolt/nut combination, the expansion sleeve 5 is moved towards the wall 14 of the profile 12 and the wedge member 6 is pressed in the expansion sleeve 5.

Figures 8A, 8B, 8C, 8D, 8E:
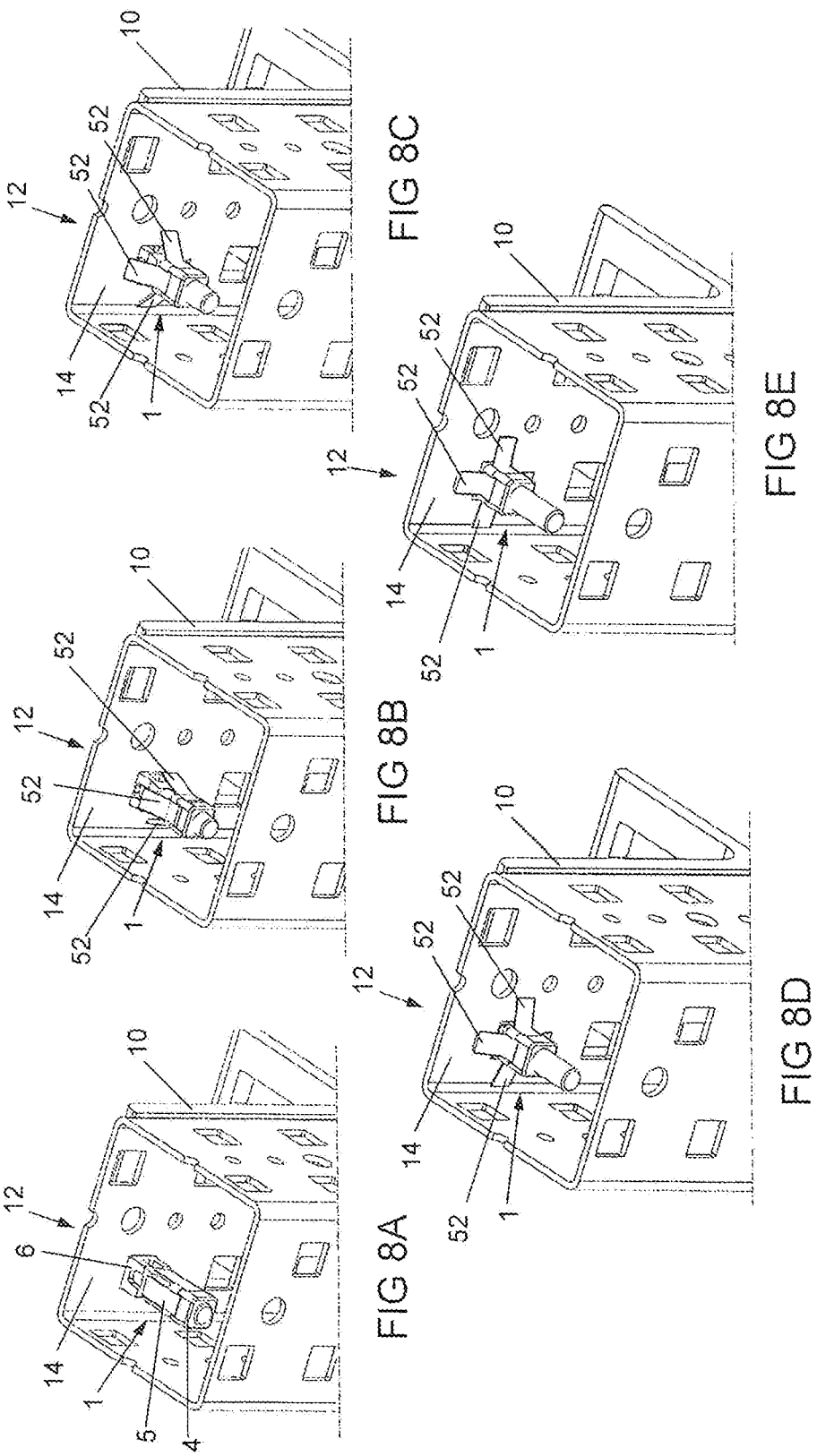

The insert end 55 of the expansion sleeve 5 is remote from the base strip 51. The lips 52 have a thickness taper towards the end as is visible in FIG. 3. The thickness taper forms the slanting inner surface portions 56 of the expansion sleeve 5 which cooperates with the tapering wedge head 62 of the wedge member 6 to deform the lips 52 and bend them outwardly. As the bolt/nut combination is further tightened the expansion sleeve 5 advances towards the wall 14 of the profile 12, while the lips 52 are progressively bent outwards as is illustrated in FIGS. 8B, whereby at some point the collapsible members 63 of the wedge member 6 start to collapse. The collapsible members 63 form in effect a crumple zone 65 of the wedge member 6, which allows the sleeve 5 to advance further towards the wall 14. The lips 52 engage the wall 14 with their slanting surface portions 56 as is shown in FIG. 8C, which then continue to slide along the wall surface of the wall 14 whereby the lips 52 bend further and the contact surface area between the wall 14 and the lips 52 is increased, as is shown in FIGS. 8D and 8E. Initially the slanting surface portions 56 engage the wall 14. At some point however, when the segments/lips 52 are bent further and further, e.g. to the state of FIG. 8E, it may be that the slanting surface portion 56 is not in contact with the wall 14 anymore and the rest of the inner surface of the lips 52 indicated by 57 in FIG. 3 engages the wall 14.

The collapsible members 63 are preferably designed to collapse at a predetermined threshold load, such that they remain intact initially, when the slanting surfaces 56 are forced outward by the tapering head 62 of the wedge member 6. Only after a further advancing of the expansion sleeve 5, the collapsible members 63 should collapse.

In FIGS. 4 and 5 is illustrated another embodiment of a fastening assembly according to the invention. This fastening assembly is indicated by the reference numeral 101.

The fastening assembly 101 includes a washer 3, an expansion sleeve 5 and a wedge member 6, which correspond to washer 3, expansion sleeve 5 and wedge member 6 in the fastening assembly 1 described in the above and shown in FIGS. 1 and 2. For a description of these parts 3, 5 and 6 referral is thus made to the above.

The fastening assembly 101 furthermore includes a bolt 102 having a bolt head 121 and a bolt shank 122. The bolt shank 122 is provided with a male thread. In the assembled state, the central axis of the bolt 102 defines the central axis of the fastening assembly 101.

In this particular embodiment, the bolt 102 has a customized head 121 with a generally square outer contour. At the side of the bolt head 121 facing the bolt shank 122 lugs 123 are formed at the corners of the square shape. In the assembled state, the lugs 123 are received in the notches 54 of the expansion sleeve 5 as is visible in FIG. 4.

The nut 104 is in this example a conventional hexagonal nut having a threaded bore, which cooperates with the shank 122 of the bolt 102.

Figure 9:
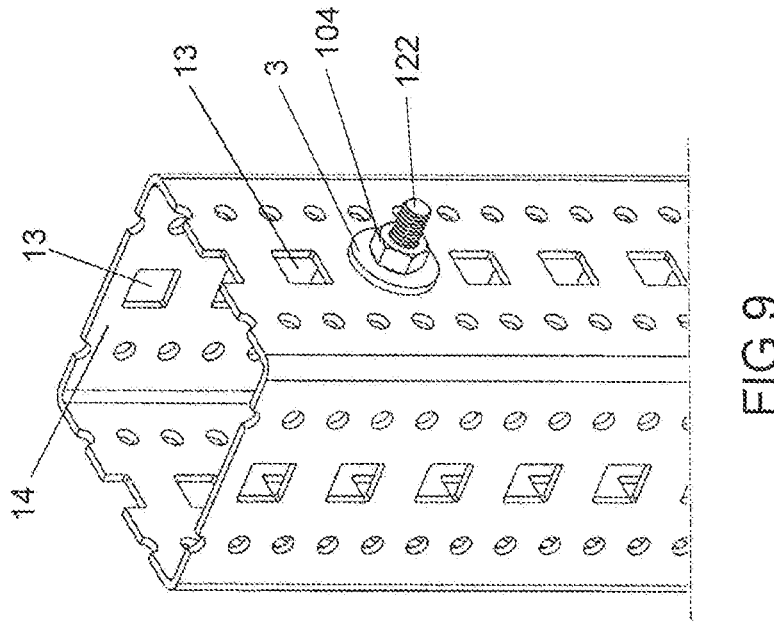
FIG. 9 shows a fastening assembly of FIG. 4 mounted to a channel profile.

In use, the fastening assembly 101 is for example used to mount other parts, e.g. a pipe clip, to a channel profile 12. As can be seen in FIG. 9 the fastening assembly 101 is inserted as a blind fastener through a mounting opening 13 in the profile 12. When the fastening assembly 101 is fully inserted and the washer 3 engages the wall 14 of the profile 12 surrounding the opening 13, the user can rotate the nut 104 by means of a tool, e.g. a spanner, engaging the nut 104. By tightening the nut 104, the shank 122 is tensioned and the combination is tightened. The bolt 102 is prevented from rotating with the nut 104 by the lugs 123 on the bolt head 121, which are received in the notches 54 of the expansion sleeve 5. The expansion sleeve 5 does not rotate because it has a rotational interlocking with the wedge member 6 through the corresponding outer contour, in this example a square contour. The wedge member 6 has a rotational interlocking with the opening 13 in the wall 14 of the constructional member 12, through the corresponding outer contour of the wedge member 6 and the opening 13. As is visible in FIG. 9 the opening 13 has a square contour, and as is visible in FIG. 4 the wedge member 6 has a square outer contour that fits in the opening 13.

By tightening of the bolt/nut combination, the expansion sleeve 5 is moved towards the wall 14 of the profile 12 and the wedge member 6 is pressed in the expansion sleeve 5.

The insert end 55 of the expansion sleeve 5 is remote from the base strip 51. The lips 52 have a thickness taper towards the end as is visible in FIG. 3. The thickness taper forms the slanting inner surface portions 56 of the expansion sleeve 5 which cooperates with the tapering wedge head 62 of the wedge member 6 to deform the lips 52 and bend them outwardly. As the bolt/nut combination is further tightened the expansion sleeve 5 advances towards the wall 14 of the profile 12, while the lips 52 are progressively bent outwards, whereby at some point the collapsible members 63 of the wedge member 6 start to collapse. The collapsible members 63 form in effect a crumple zone 64 of the wedge member 6, which allows the sleeve 5 to advance further towards the wall 14. The lips 52 engage the wall 14 with their slanting surface portions, which then continue to slide along the wall surface whereby the lips 52 bend further and the contact surface area between the wall 14 and the lips 52 is increased comparable to what is shown in FIGS. 8D and 8E.

Initially the slanting surface portions 56 engage the wall 14. At some point however, when the segments/lips 52 are bent further and further, e.g. to the state comparable to the one seen in FIG. 8E, it may be that the slanting surface portion 56 is not in contact with the wall 14 anymore and the rest of the inner surface of the lips 52 indicated by 57 in FIG. 3 engages the wall 14.

It is noted here that the wedge member 6 is made having a wedge head 62 and a base ring 61 which are interconnected by a plurality of collapsible spacers 63. Other designs are possible. An embodiment in which the collapsible members are longer is for example conceivable for connecting thicker parts than for example the bracket 10 shown in FIG. 6. Furthermore, it is conceivable to omit the base ring and have the collapsible members only be connected at one end to the wedge head 62. It is also possible to design the collapsible members such that they are interconnected pairwise by a wall and that the pairs are only interconnected at the wedge head 62. It is also possible that the intermediate spaces 64 are at least partially replaced by thin wall portions, which easily collapse together with the spacers 63.

The invention claimed is:

1. A fastening assembly adapted to be inserted through a mounting opening in a wall of a constructional member, the fastening assembly comprising:

a bolt having an at least partially threaded bolt shank and a bolt head, an expansion sleeve fitted in use over at least a part of the bolt shank and having deformable wall segments;

a washer arranged over the bolt shank and adapted to engage a wall surface of the constructional member or another component to be attached to the constructional member;

a wedge member arranged between the washer and the expansion sleeve and having a wedge portion adapted to be inserted in one end of the expansion sleeve;

a threaded nut arranged on the threaded portion of the shank and adapted to cooperate with the bolt to tighten the washer and the expansion sleeve towards each other so as to pull the wedge portion of the wedge member into the expansion sleeve resulting in the wall segments being pushed outwardly, wherein the expansion sleeve is a metal part, wherein the wall segments of the expansion sleeve have an inner side with an inner side surface adapted and arranged to engage a wall surface surrounding the opening in the wall of the constructional member opposite the washer when tightening the fastening assembly to a tightened state, wherein the wedge member comprises a crumple zone extending from the wedge portion towards the washer, wherein the crumple zone includes collapsible spacers connected to the wedge portion, and wherein the collapsible spacers are circumferentially separated by intermediate spaces and/or intermediate wall portions weaker than the collapsible spacers.

2. The fastening assembly according to claim 1, wherein the inner side of the wall segments of the expansion sleeve have a slanting inner surface portion towards the edge, which slanting inner surface portion is adapted and arranged to at least initially engage a wall surface surrounding the opening in the wall when tightening the fastening assembly.

3. The fastening assembly according to claim 1, wherein the wedge member is a collapsible part, which is adapted to collapse when the wall segments of the expansion sleeve are tightened towards the wall of the constructional member.

4. The fastening assembly according to claim 1, wherein the collapsible spacers are interconnected at least at an end facing away from the wedge portion by an annular end portion, the annular end portion having an engagement surface engaging the washer.

5. The fastening assembly according to claim 1, wherein the wedge member is a plastic part.

6. The fastening assembly according to claim 1, wherein the wedge member is made in one piece.

7. The fastening assembly according to claim 1, wherein the wedge member is adapted to block rotation of the wedge member in the mounting opening in the wall of the constructional member.

8. The fastening assembly according to claim 1, wherein the wedge member and the expansion sleeve are adapted to block mutual rotation around a central axis of the fastening assembly.

9. The fastening assembly according to claim 1, wherein the expansion sleeve has a substantially square cross section and wherein the wedge member has a substantially square cross section.

10. The fastening assembly according to claim 1, wherein the bolt head is located on the washer sided end and the nut is arranged on the sleeve sided end.

11. The fastening assembly according to claim 10, wherein the nut and the expansion sleeve are adapted to block mutual rotation between the nut and expansion sleeve.

12. The fastening assembly according to claim 11, wherein the expansion sleeve is provided with notches and the nut is provided with lugs that are received in the notches so as to block mutual rotation between nut and expansion sleeve.

13. The fastening assembly according to claim 1, wherein the bolt head is located on the sleeve sided end and the nut is located on the washer sided end.

14. The fastening assembly according to claim 13, wherein the bolt head and the expansion sleeve are adapted to block mutual rotation between the bolt and expansion sleeve.

15. The fastening assembly according to claim 14, wherein the expansion sleeve is provided with notches and the bolt head is provided with lugs that are received in the notches so as to block mutual rotation between bolt head and expansion sleeve.

16. The fastening assembly according to claim 1, wherein the expansion sleeve is formed as a metal base strip and at least two straight lips connected to and extending from the base strip, said lips being separated by a longitudinal gap, wherein the base strip is formed into an annular shape.

17. The fastening assembly according to claim 16, wherein the expansion sleeve has four adjacent straight lips connected to and extending from the base strip.

18. The fastening assembly according to claim 17, wherein the base strip is folded into a rectangular shape, in which the corners are located at the level of the gaps.

19. The fastening assembly according to claim 16, wherein the insert end of the expansion sleeve is remote from the base strip, wherein at least a part of the lips has a thickness taper towards the end, said thickness taper forming the slanting inner surface portion of the expansion sleeve for cooperation with the wedge member.

20. A fastening assembly adapted to be inserted through a mounting opening in a wall of a constructional member, the fastening assembly comprising:

a bolt having an at least partially threaded bolt shank and a bolt head, an expansion sleeve fitted in use over at least a part of the bolt shank and having deformable wall segments;

a washer arranged over the bolt shank and adapted to engage a wall surface of the constructional member or another component to be attached to the constructional member;

a wedge member arranged between the washer and the expansion sleeve and having a wedge portion adapted to be inserted in one end of the expansion sleeve;

a threaded nut arranged on the threaded portion of the shank and adapted to cooperate with the bolt to tighten the washer and the expansion sleeve towards each other so as to pull the wedge portion of the wedge member into the expansion sleeve resulting in the wall segments being pushed outwardly, wherein the expansion sleeve is a metal part, wherein the wall segments of the expansion sleeve have an inner side with an inner side surface adapted and arranged to engage a wall surface surrounding the opening in the wall of the constructional member opposite the washer when tightening the fastening assembly to a tightened state, wherein the expansion sleeve is formed as a metal base strip and has four adjacent straight lips connected to and extending from the base strip, said lips being separated by a longitudinal gap, wherein the base strip is formed into an annular shape, wherein the base strip is folded into a rectangular shape, in which the corners are located at the level of the gaps.

\* \* \* \* \*